(12) United States Patent
Yamamoto et al.

(10) Patent No.: US 6,461,261 B2
(45) Date of Patent: Oct. 8, 2002

(54) CONTROL APPARATUS AND METHOD OF CONTINUOUSLY VARIABLE TRANSMISSION

(75) Inventors: Yoshiaki Yamamoto, Toyota (JP); Tadashi Tamura, Nishikamo-gun (JP); Daisuke Inoue, Toyota (JP); Katsumi Kono, Toyota (JP); Hiroji Taniguchi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/859,494

(22) Filed: May 18, 2001

(65) Prior Publication Data

US 2001/0049316 A1 Dec. 6, 2001

(30) Foreign Application Priority Data

May 23, 2000 (JP) ........................................ 2000-151303

(51) Int. Cl.$^7$ ............................................. F16H 55/56
(52) U.S. Cl. ............................................. 474/8; 476/61
(58) Field of Search ........................... 474/8, 28; 476/61

(56) References Cited

U.S. PATENT DOCUMENTS 4,322,798 A * 3/1982 McCoin
6,106,420 A * 8/2000 Ketelaars et al. ............... 474/2
6,146,294 A * 11/2000 Bolz ............................. 474/8
6,387,009 B1 * 5/2002 Haka ........................... 475/11

FOREIGN PATENT DOCUMENTS

| JP | 3-129158 | 6/1991 |
| JP | 3-209050 | 9/1991 |
| JP | 4-64760 | 2/1992 |
| JP | 9-324853 | 12/1997 |

* cited by examiner

Primary Examiner—Dirk Wright
(74) Attorney, Agent, or Firm—Oliff & Berridge, PLC

(57) ABSTRACT

An apparatus and a method control a continuously variable transmission of a motor vehicle which includes a power transmitting member for power transmission by use of friction. A controller of the apparatus detects slippage of the power transmitting member in a predetermined period of running of the vehicle, and increases a clamping pressure that is applied to the power transmitting member when slippage of the power transmitting member is detected. The controller also stores a state of increase of the clamping pressure in a memory, and increases the clamping pressure applied to the power transmitting member in accordance with a previous state of increase of the clamping pressure that was stored in the memory in a previous period of operation of the vehicle.

22 Claims, 8 Drawing Sheets

US 6,461,261 B2

CONTROL APPARATUS AND METHOD OF CONTINUOUSLY VARIABLE TRANSMISSION

INCORPORATION BY REFERENCE

The disclosure of Japanese Patent Application No. 2000-151303 filed on May 23, 2001, including the specification, drawings and abstract, is incorporated herein by reference in its entirety.

BACKGROUND OF THE INVENTION

1. Field of Invention

The invention relates to an apparatus and a method for controlling a continuously variable transmission and, more particularly, to a technique for preventing deterioration of the durability caused by slippage of a power transmitting member.

2. Description of Related Art

For use in a continuously variable transmissions of a motor vehicle that transmits power or driving torque by use of friction with a power transmitting member, a control apparatus is known which is adapted to increase a clamping pressure applied to the power transmitting member when slippage of the power transmitting member is detected during a certain running period. An example of the control apparatus is disclosed in Japanese laid-open Patent Publication No. 9-324853. The continuously variable transmission disclosed in this publication is of a belt-and-pulley type having a pair of variable pulleys whose effective diameters are variable, and a torque transfer belt (serving as a power transmitting member) that is wound around the pulleys. In this transmission, the clamping pressure applied to the torque transfer belt is immediately increased if slippage of the torque transfer belt is detected while an engine load is increasing, for example, upon a start of the vehicle. Subsequently, if it is determined that the torque transfer belt is no longer slipping, the belt clamping pressure is returned to a normal clamping pressure that is determined based on the input torque and the speed ratio.

With the control apparatus of the continuously variable transmission as disclosed in JP-A-9-324853 as identified above, the clamping pressure is returned to the normal clamping pressure if the power transmitting member (i.e., the torque transfer belt) is no longer slipping, and therefore the power transmitting member is likely to slip again if the vehicle running or operating conditions become close to the conditions under which the previous belt slippage occurred, during running of the vehicle. This undesirably results in reductions of the service life or durability of the power transmitting member.

SUMMARY OF THE INVENTION

It is therefore an object of the invention to provide a control apparatus of a continuously variable transmission of a motor vehicle, which is adapted to suitably prevent a power transmitting member from slipping again after a slip was detected and eliminated by, for example, increasing a clamping pressure.

To accomplish the above and/or other objects, the invention provides an apparatus and a method for controlling a continuously variable transmission of a motor vehicle which is adapted to transmit power by use of friction with a power. transmitting member thereof. The apparatus includes a controller that: (a) detects slippage of the power transmitting member in a predetermined period of operation of the vehicle, (b) increases a clamping pressure that is applied to the power transmitting member when slippage of the power transmitting member is detected in the predetermined period; and (c) stores a state of increase of the clamping pressure in a memory. In the control apparatus, the controller increases the clamping pressure applied to the power transmitting member in accordance with a previous state of increase of the clamping pressure that is stored in the memory. With this arrangement, the power transmitting member is prevented from slipping again during a current period of operation of the vehicle following the previous operating period in which slippage of the power transmitting member occurred. It is thus possible to avoid a reduction in the durability of the power transmitting member due to slipping thereof.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein.

DETAILED DESCRIPTION OF PREFERRED EMBODIMENTS

A preferred embodiment of the invention will be hereinafter described in detail with reference to the accompanying drawings.

Figure 1:
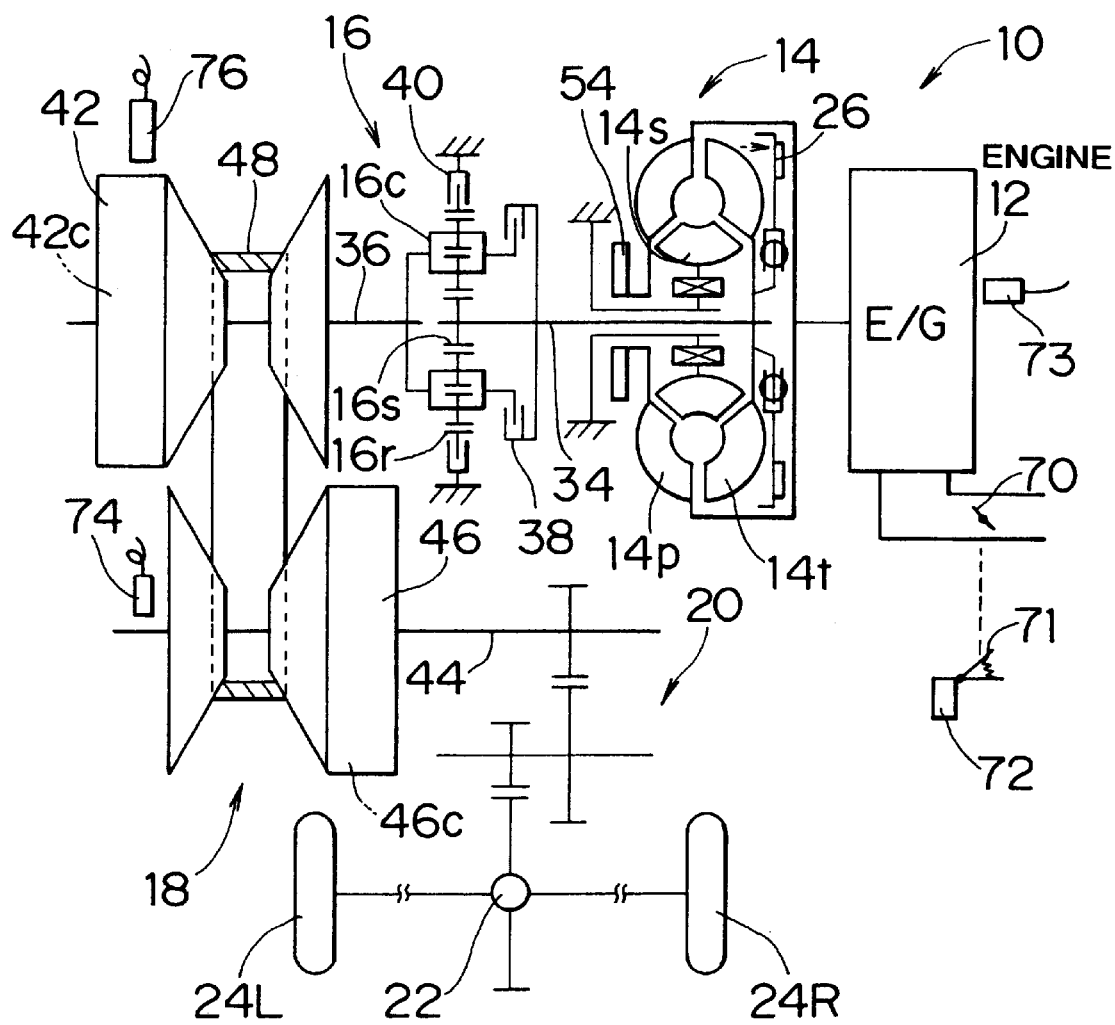
FIG. 1 is a schematic diagram of a power transmitting apparatus of a motor vehicle to which a control apparatus according to an embodiment of the invention is applied.

FIG. 1 shows a power transmitting apparatus 10 that includes a belt-type continuously variable transmission 18 to which a control apparatus according to one embodiment of the invention is applied. The power transmitting apparatus 10 is of the transversely-mounted type, and is suitably employed in FF (front-engine and front-drive) type vehicles. The power transmitting apparatus 10 has an internal combustion engine 12 that is used as a power source for running the vehicle. The output of the engine 12 is transmitted to a differential gear set 22 via a torque converter 14, a forward/reverse-drive switching device 16, a belt-type continuously variable transmission (CVT) 18, and a speed reducing gear train 20, and is then distributed to right-hand and left-hand side drive wheels 24R 24L. The belt-type continuously variable transmission 18 is disposed in a power transmitting path between the engine 12 and the right and left drive wheels 24R, 24L.

The torque converter 14 has a pump impeller 14p connected to a crankshaft of the engine 12, a bladed turbine 14t connected to the forward/reverse-drive switching device 16 via a turbine shaft 34, and a bladed stator 14s that is rotatably supported on a non-rotational or stationary member via a one-way clutch. The torque converter 14 utilizes a fluid for transmitting power from the engine 12 to the switching device 16. A lockup clutch 26 is provided between the pump impeller 14p and the bladed turbine 14t, and is capable of coupling the impeller 14p directly with the turbine 14t so that the impeller 14p and the turbine 14t can rotate together as a unit.

The forward/reverse-drive switching device 16 generally consists of a double-pinion-type planetary gear set or device. The switching device 16 includes a sun gear 16s to which the turbine shaft 34 of the torque converter 14 is connected, a carrier 16c to which an input shaft 36 of the continuously variable transmission 18 is connected, and a ring gear 16r. When a forward-drive clutch 38 disposed between the carrier 16c and the sun gear 16s is engaged, the forward/reverse-drive switching device 16 is rotated as a unit with the turbine shaft 34 being directly coupled with the input shaft 36, so that forward driving force is transmitted to the drive wheels 24R, 24L. When a reverse-drive brake 40 disposed between the ring gear 16r and a housing is engaged and the forward-drive clutch 38 is released, the input shaft 36 is rotated in a direction opposite to the rotating direction of the turbine shaft 34, so that reverse driving force is transmitted to the drive wheels 24R, 24L to run the vehicle in a reverse direction.

Figure 3:
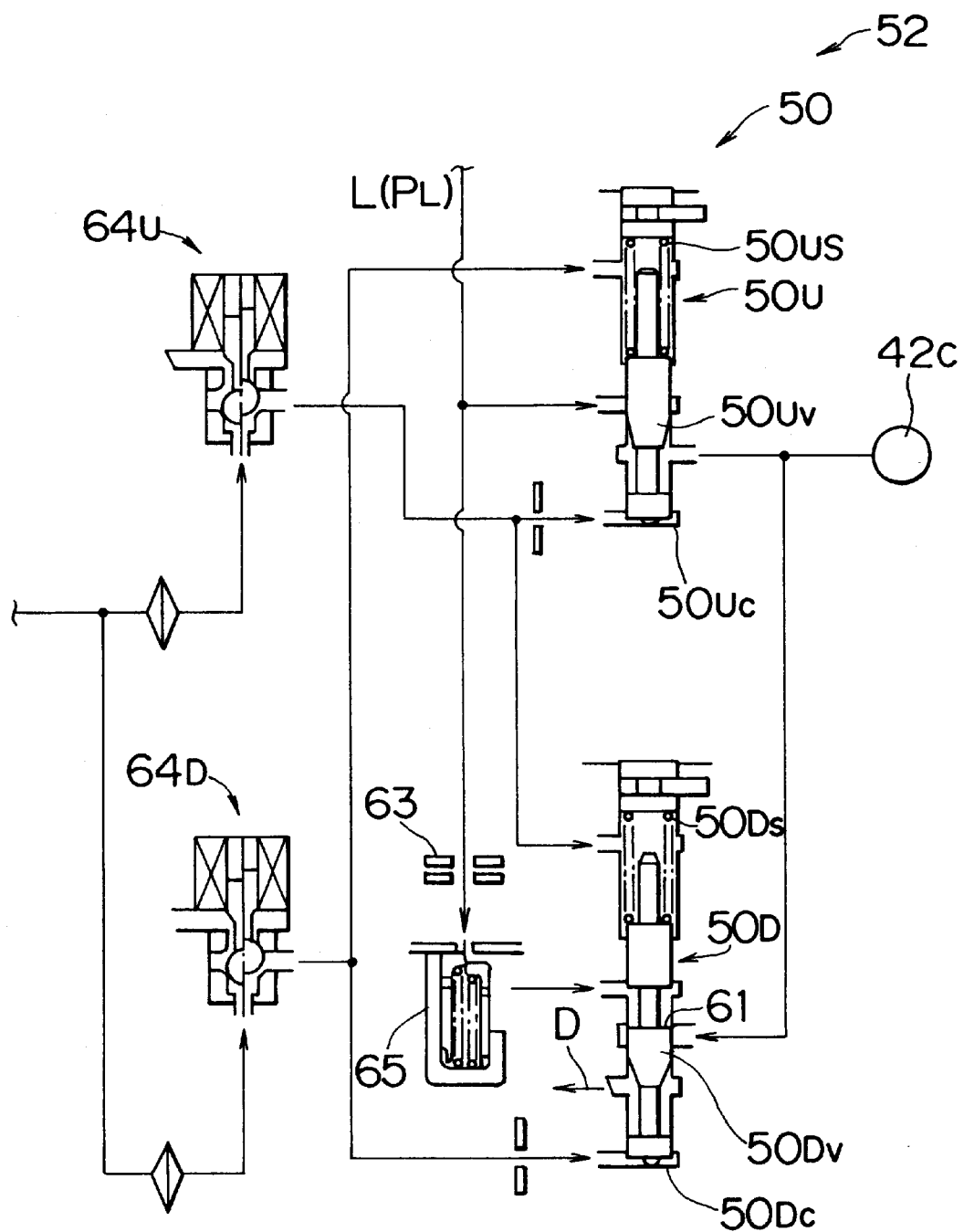
FIG. 3 is a diagram illustrating a portion of the oil pressure control circuit for controlling the belt-type continuously variable transmission in the power transmitting apparatus of FIG. 1, in particular, such a portion that is related to speed ratio control.

The belt-type continuously variable transmission 18 has an input-side variable pulley 42 which is provided on the input shaft 36 and whose effective diameter is variable, an output-side variable pulley 46 which is provided on an output shaft 44 and whose effective diameter is variable, and a torque transfer belt 48 that is wound around V-shaped grooves of the variable pulleys 42, 46. In the continuously variable transmission 18, power is transmitted by utilizing friction between the torque transfer belt 48 serving as a power transmitting member, and inner walls of the V-shaped grooves of the variable pulleys 42, 46. The variable pulleys 42, 46 are provided with an input-side hydraulic cylinder 42c and an output-side hydraulic cylinder 46c, respectively, for changing the respective V-shaped groove widths or the engagement diameters of the torque transfer belt 48. A speed ratio control valve system 50 as shown in FIG. 3 is provided in a hydraulic control circuit 52 for controlling the amount of a hydraulic fluid or oil supplied to or discharged from the hydraulic cylinder 42c of the input-side variable pulley 42, thereby to change the V groove width of each variable pulley 42, 46. As a result, the diameter (effective diameter) of each pulley at which the torque transfer belt 48 engages with the pulley is changed so that the speed ratio γ (=the speed of rotation of the input shaft NIN/the speed of rotation of the output shaft NOUT) is continuously varied.

The oil pressure $P_B$ in the hydraulic cylinder 46c of the output-side variable pulley 46 corresponds to the clamping pressure applied to the torque transfer belt 48 on the variable pulley 46 and to the tension of the belt 48. The oil pressure $P_B$ is closely related to the tension of the torque transfer belt 48, namely, the pressing force of the torque transfer belt 48 applied to the inner walls of the V-shaped groove of each of the two pulleys 42, 46. Thus, the oil pressure $P_B$ may also called "belt tension control pressure", "clamping control pressure" or "belt-pressing-force control pressure". In order to prevent slippage of the torque transfer belt 48 during an operation of the continuously variable transmission 18, the oil pressure $P_B$ in the hydraulic cylinder 46c is regulated by a clamping pressure control valve 60 provided in the hydraulic control circuit 52.

Figure 2:
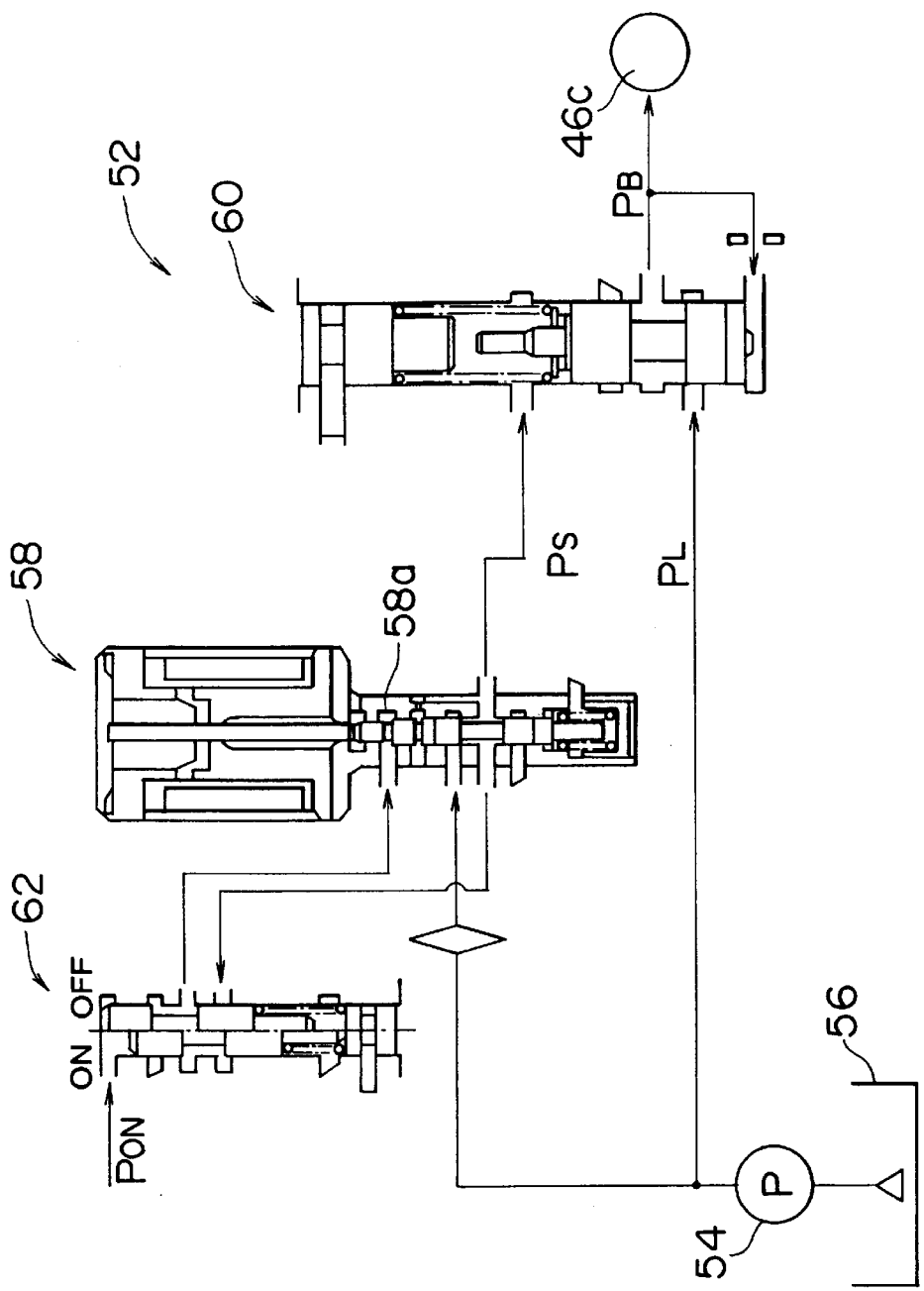
FIG. 2 is a diagram illustrating a portion of an oil pressure control circuit for controlling a belt-type continuously variable transmission in the power transmitting apparatus of FIG. 1, in particular, such a portion that is related to belt tension control.

FIGS. 2 and 3 illustrate an example of the hydraulic control circuit 52. FIG. 2 shows a circuit related to an operation of regulating the belt tension control pressure. FIG. 3 shows a circuit related to speed-ratio control. In FIG. 2, a hydraulic oil returned to an oil tank 56 is pumped by a hydraulic pump 54 that is driven by the engine 12, and is then regulated to a line pressure $P_L$ by a line pressure regulator valve (not shown). After that, the regulated line pressure $P_L$ is supplied as source pressure to a linear solenoid valve 58 and to the clamping pressure control valve 60. With magnetizing current applied from an electronic control unit 66 (see FIG. 4) to the linear solenoid valve 58 being continuously controlled, the linear solenoid valve 58 regulates a pressure of the hydraulic oil supplied from the hydraulic pump 54, to generate a control pressure Ps whose level corresponds to the magnetizing current, which pressure Ps is then supplied to the clamping pressure control valve 60. The clamping pressure control valve 60 generates an oil pressure $P_B$ that increases with an increase in the control pressure Ps, and supplies the oil pressure $P_B$ to the hydraulic cylinder 46c of the output-side variable pulley 46. In this manner, the clamping pressure applied to the torque transfer belt 48, that is, the tension of the torque transfer belt 48, is controlled to be as small as possible within a range in which slippage of the torque transfer belt 48 does not occur. As the hydraulic pressure $P_B$ increases, the belt clamping pressure, namely, the frictional force between the torque transfer belt 48 and the variable pulleys 42, 46, is accordingly increased.

The above-described hydraulic control circuit 52 further includes a cutback valve 62. When the cutback valve 62 is ON, the control pressure $P_S$ received from the linear solenoid valve 58 is supplied to an oil chamber 58a of the solenoid valve 58. When the cutback valve 62 is OFF, the supply of the control pressure $P_S$ to the oil chamber 58a is discontinued, and the oil chamber 58a is exposed to the atmosphere. In this manner, the control pressure $P_S$, and consequently the oil pressure $P_B$, is switched to a lower level (i.e., is reduced or cut back) when the cutback valve 62 is ON, as compared with the case where the cutback valve 62 is OFF. The cutback valve 62 is switched ON in response to a signal pressure $P_{ON}$ supplied from a solenoid valve (not shown) when the lockup clutch 26 of the torque converter 14 is ON (engaged).

Figure 4:
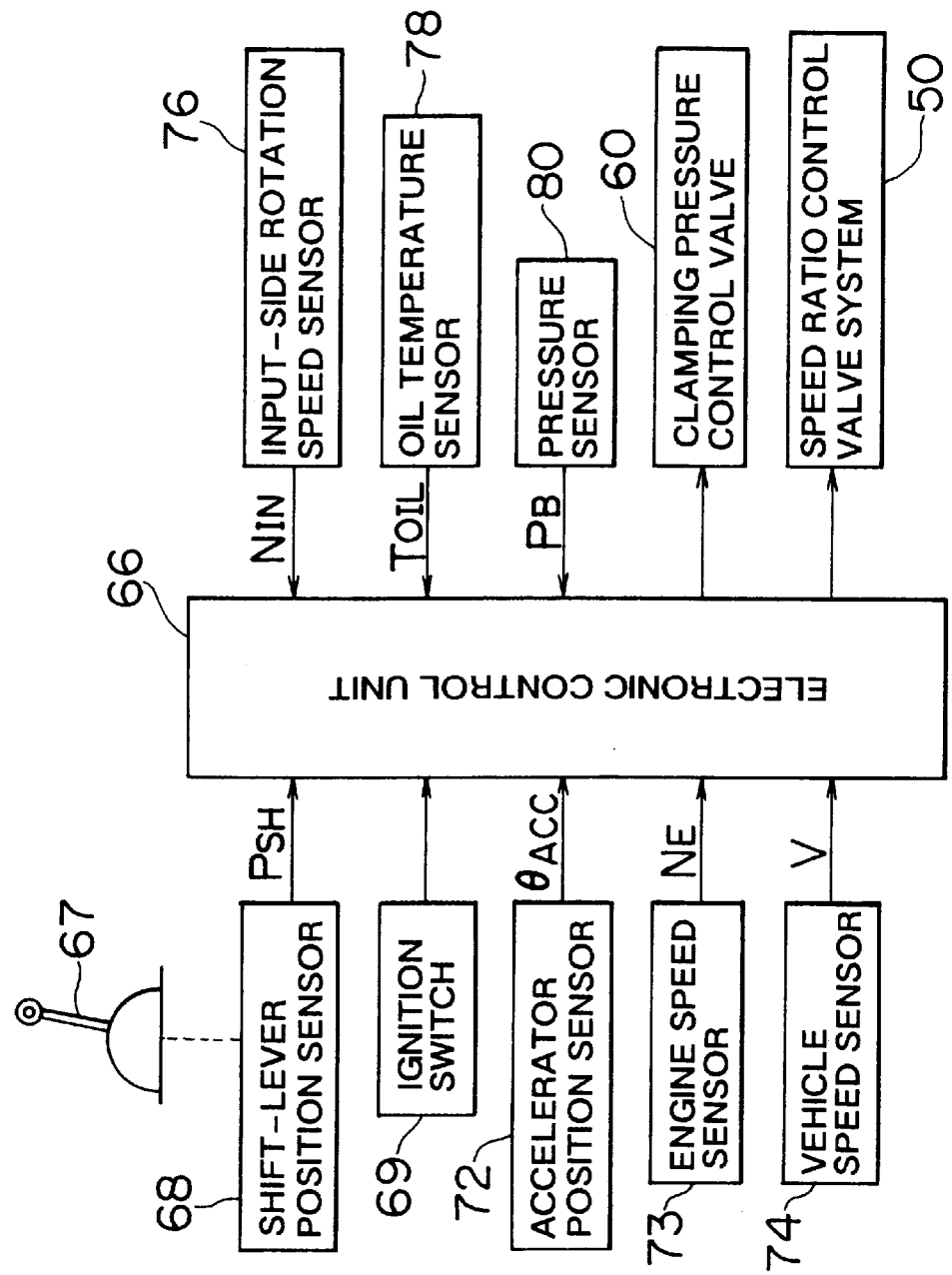
FIG. 4 is a schematic diagram illustrating an electrical arrangement of the control apparatus of the embodiment shown in FIG. 1.

Referring to FIG. 3, the speed ratio control valve system 50 includes an upshift control valve $50_U$ and a downshift control valve $50_D$. The upshift control valve $50_U$ controls the rate of change in the speed ratio in the upshift direction by supplying hydraulic oil of the line pressure $P_L$ exclusively to the hydraulic cylinder 42c of the input-side variable pulley 42 and controlling the amount of flow of the hydraulic oil thereto. The downshift control valve $50_D$ controls the rate of change in the speed ratio in the downshift direction by controlling the amount of flow of hydraulic oil discharged from the input-side hydraulic cylinder 42c. The upshift control valve $50_U$ has a spool $50_{UV}$ that is movable between an open position and a closed position for allowing and inhibiting fluid communication between the inputside hydraulic cylinder 42c and a line oil passage L conducting the line pressure $P_L$, respectively. The upshift control valve $50_U$ further has a spring $50_{US}$ that urges the spool $50_{UV}$ in the closing direction, and a control oil chamber $50_{UC}$ that receives the control pressure from an upshift-side solenoid valve $64_U$. The downshift control valve $50_D$ has a spool $50_{DV}$ that is movable between an open position and a closed position for allowing and inhibiting fluid communication between a drain oil passage D and the input-side hydraulic cylinder 42c, respectively. The downshift control valve $50_D$ further has a spring $50_{DS}$ that urges the spool $50_{DV}$ in the closing direction, and a control oil chamber $50_{DC}$ that receives the control pressure from a downshift-side solenoid valve $64_D$. The upshift-side solenoid valve $64_U$ and the downshift-side solenoid valve $64_D$, which are driven with suitably controlled duty ratios by the electronic control unit 66, supply the control oil chamber $50_{UC}$ and the control oil chamber $50_{DC}$ with control pressures that are continuously changed. In this manner, the speed ratio γ of the belt-type continuously variable transmission 18 is continuously varied in the upshift or decreasing direction and the downshift or increasing direction. The downshift control valve $50_D$ is designed such that when the spool $50_{DV}$ is in the closed position, a flow passage 61 having a small flow sectional area is formed between the line oil passage L and the input-side hydraulic cylinder 42c. When both the upshift control valve $50_U$ and the downshift control valve $50_D$ are in the closed states, a small amount of hydraulic oil is supplied from the line oil passage L via a restrictor 63, a one-way valve 65 and the flow passage 61, so as not to change the speed ratio γ. This is because slight leakage of hydraulic oil occurs due to a load applied to each of the input-side hydraulic cylinder 42c and the output-side hydraulic cylinder 46c unevenly with respect to the rotation axis thereof, even in the presence of a seal member 47 at a sliding portion As shown in FIG. 4, the electronic control unit 66 receives a signal indicating an operated position $P_{SH}$ of a shift lever 67 from a shift-lever position sensor 68 for detecting the operated position of the shift lever 67, and a signal indicating turning-on of an ignition key from an ignition switch 69 that is operated by an ignition key. The electronic control unit 66 also receives a signal indicating an accelerator position $\theta_{ACC}$ from an accelerator position sensor 72 for detecting the accelerator pedal position $\theta_{ACC}$ of an accelerator pedal 71 that changes the opening of a throttle valve 70, and a signal indicating an engine speed NE from an engine speed sensor 73 for detecting the revolution speed NE of the engine 12. The electronic control unit 66 further receives a signal indicating a vehicle speed V from a vehicle speed sensor (or output-side rotation speed sensor) 74 for detecting the vehicle speed V (more specifically, the rotation speed $N_{OUT}$ of the output shaft 44), a signal indicating the input-shaft rotation speed $N_{IN}$ of the input shaft 36, from an input-side rotation speed sensor 76, a signal indicating a hydraulic oil temperature $T_{OIL}$ from an oil temperature sensor 78 for detecting the hydraulic oil temperature $T_{OIL}$ in power transmitting apparatus 10, or in the belt-type continuously variable transmission 18, and a signal indicating an oil pressure $P_B$ from a pressure sensor 80 for detecting the internal pressure $P_B$ in the hydraulic cylinder 46c of the output-side variable pulley 46, that is, the actual clamping control pressure $P_B$.

Figure 5:
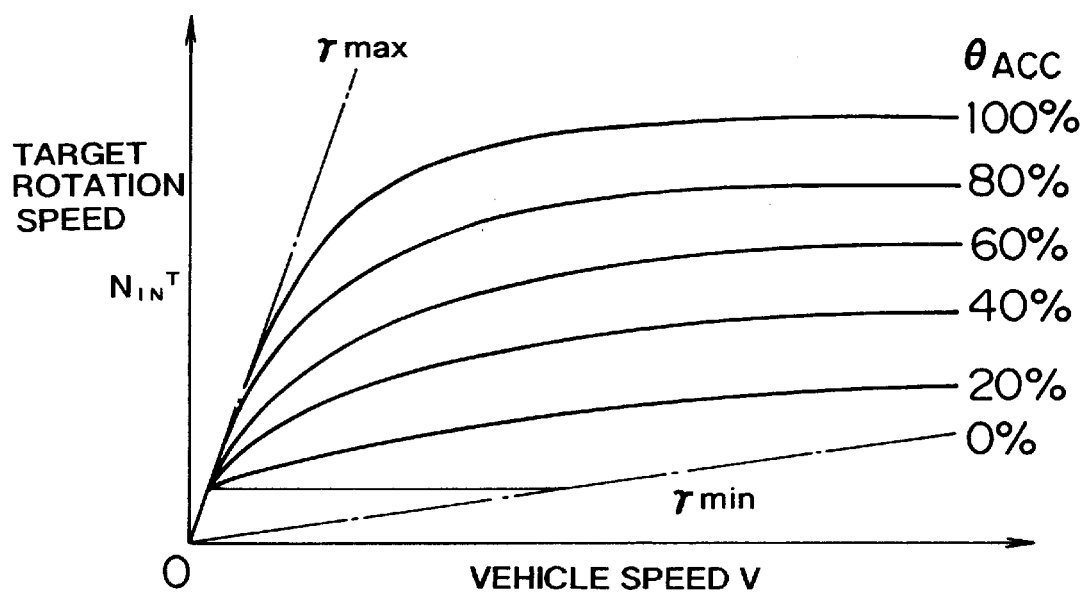
FIG. 5 is a graph indicating a pre-stored relationship used for determining a target rotation speed in the speed ratio control performed by an electronic control unit as shown in FIG. 4.

The electronic control unit 66 includes a so-called microcomputer that is generally composed of a CPU, a ROM, a RAM, input and output interfaces, etc. By processing signals in accordance with programs pre-stored in the ROM while utilizing the temporary storage function of the RAM, the electronic control unit 66 performs speed ratio control, clamping pressure control, and other control operations for the belt-type continuously variable transmission 18. More specifically, in the speed ratio control, the electronic control unit 66 calculates a target rotation speed $N_{IN}^T$ based on an accelerator position $\theta_{ACC}$ (%), that is, the operating amount of the accelerator pedal that indicates an output requirement made by an actual vehicle operator or driver, and the vehicle speed V (corresponding to the output-shaft rotation speed $N_{OUT}$), with reference to a pre-stored relationship (map) as shown in FIG. 5 by way of example. The electronic control unit 66 operates the speed ratio control system 50 so that the actual input-shaft rotation speed $N_{IN}$ becomes equal to the target rotation speed $N_{IN}^T$, thereby to control the amount of flow of hydraulic oil supplied into the hydraulic cylinder 42c of the input-side variable pulley 42 or discharged from the hydraulic cylinder 42c. The map indicated in FIG. 5 indicates relationships that are predetermined so as to operate the engine 12 in accordance with an optimal curve that optimizes engine output and fuel economy. In FIG. 5, γmax represents a maximum speed ratio, and γmin represents a minimum speed ratio.

In the clamping pressure control, the electronic control unit 66 calculates a belt clamping control pressure (target value) based on the actual speed ratio γ and the actual input torque $T_{IN}$ of the transmission 18 or the accelerator position $\theta_{ACC}$ corresponding to the transferred torque, with reference to a relationship (map) that is predetermined in order to achieve a necessary and sufficient oil pressure (target oil pressure corresponding to an ideal belt clamping pressure). The electronic control unit 66 then causes the clamping pressure control valve 60 to regulate a pressure in the oil pressure control circuit 52 so as to provide the belt clamping control pressure thus calculated.

Figure 6:
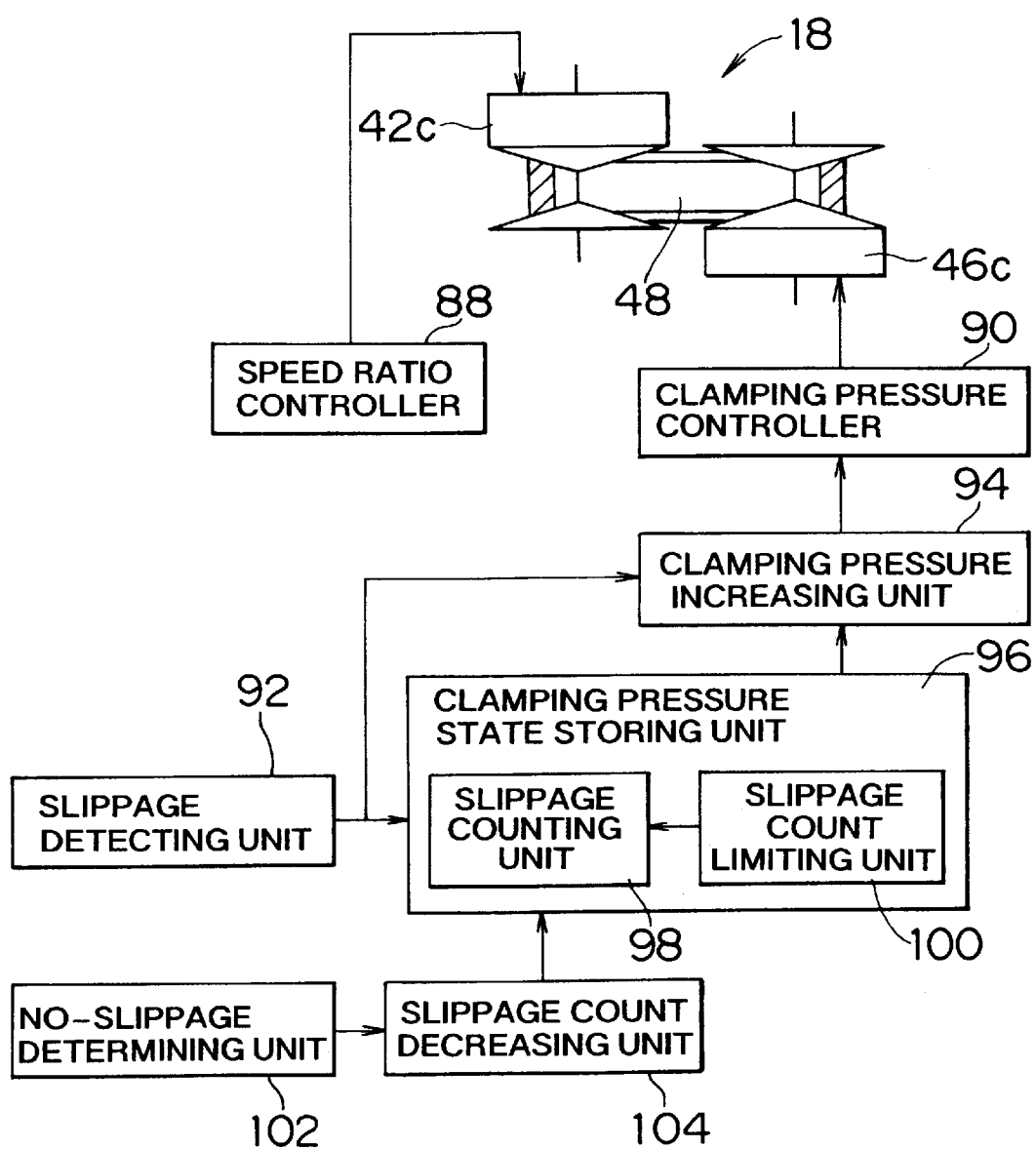
FIG. 6 is a function block diagram illustrating control functions of the electronic control unit of FIG. 4.

FIG. 6 is a function block diagram useful for explaining principal control functions of the electronic control unit 66, including the belt clamping pressure control. During running of the vehicle, a speed ratio controller 88 as shown in FIG. 6 calculates a target input-shaft rotation speed $N_{IN}^T$ based on the actual accelerator position $\theta_{ACC}$ (%) and the vehicle speed V (corresponding to the output-shaft rotation speed $N_{OUT}$), with reference to the predetermined relationship (map) as shown in, for example, FIG. 5. The speed ratio controller 88 then determines a duty ratio D (%) at which the upshift control valve $50_U$ or the downshift control valve $50_D$ of the speed ratio control valve system 50 is driven, so that the actual input-shaft rotation speed $N_{IN}$ becomes equal to the target rotation speed $N_{IN}^T$. By performing feedback control in which the upshift or downshift control valve is operated or driven at the duty ratio D, the speed ratio controller 88 controls the amount of flow of hydraulic oil supplied to the hydraulic cylinder 42c of the input-side variable pulley 42 or discharged from the hydraulic cylinder 42c of the input-side variable pulley 42.

In order to achieve a necessary and sufficient oil pressure (a target oil pressure corresponding to an ideal belt clamping pressure) for providing a clamping force applied to the torque transfer belt 48, having a force as small as possible within a range in which the torque transfer belt 48 will not slip, a clamping pressure controller 90 calculates a belt clamping control pressure (target value) $P_B^T$ based on the actual speed ratio γ and the accelerator position $\theta_{ACC}$ corresponding to the transferred torque or the actual input torque $T_{IN}$ of the transmission 18, with reference to a predetermined relationship (map). The clamping pressure controller 90 then causes the clamping pressure control valve 60 in the oil pressure control circuit 52 to regulate a pressure so that the actual clamping control pressure $P_B$ becomes equal to the target value $P_B{}^T$. The aforementioned relationship is determined based on, for example, theoretical values obtained for steady running of the vehicle.

A slippage detecting unit 92 detects slippage of the torque transfer belt 48, if the actual speed ratio γ of the belt-type continuously variable transmission 18, which is sequentially determined, exceeds a pre-set reference value $γ_B$, or if the rate of change Δγ in the speed ratio exceeds a pre-set reference value $Δγ_C$. The reference value $γ_B$ is preferably set to be greater by a predetermined value than a maximum speed ratio γmax that is permissible in terms of the mechanism of the belt-type continuously variable transmission 18, namely, is set to the lowest value in a range of values that the speed ratio γ cannot take in view of the mechanism of the transmission 18. The reference value $Δγ_C$ is set to a value that is greater by a predetermined value than the maximum rate Δγmax of change in the speed ratio that is determined in view of the mechanisms of the belt-type continuously variable transmission 18 and the oil pressure control circuit 52.

In order to stop slippage of the torque transfer belt 48 immediately after the slippage is detected, a clamping pressure increasing unit 94 increases the clamping pressure on the torque transfer belt 48 by means of the clamping pressure controller 90 by adding a predetermined value to the target clamping pressure $P_B{}^T$ every time a slippage of the torque transfer belt 48 is detected by the slippage detecting unit 92.

A clamping pressure state storing unit 96 stores the state of increases of the clamping pressure caused by the clamping pressure increasing unit 94 during a predetermined period of running of the vehicle, for example, during one trip of the vehicle (which starts upon turn-on of the ignition switch and ends upon turn-off of the switch, or which starts upon a start of the vehicle engine and ends upon a stop of the engine) so that the stored information can be used during the next running of the vehicle. The content thus stored is the state or degree of increase of the clamping pressure at the end of the predetermined period of running. The clamping pressure state storing unit 96 includes, for example, a slippage counting unit 98 that counts the number of slippages ""$n_S$"" that have occurred, that is, increments its counter every time the slippage detecting unit 92 detects a slippage of the torque transfer belt 48, and a slippage count limiting unit 100 that limits the number of slippages "$n_S$" counted by the slippage counting unit 98 to a pre-set upper limit value "$n_{Smax}$". The clamping pressure state storing unit 96 stores the number of slippages "$n_S$" that represents the state or degree of increase of the clamping pressure caused by the clamping pressure increasing unit 94. Each time the number of slippages "$n_S$" is incremented, the clamping pressure is increased by a predetermined amount. Since the amount of an increase in the clamping pressure increases with the number of slippages "$n_S$", the aforementioned upper limit value "$n_{Smax}$" is set to an empirically determined value, for example, about "3", in order to avoid a reduction in the durability of the torque transfer belt 48 due to an otherwise increased clamping pressure.

A no-slippage determining unit 102 determines whether no slippage of the torque transfer belt 48 was detected by the slippage detecting unit 92 during a predetermined running period, for example, during a running period of one trip or a predetermined number of trips. If the no-slippage determining unit 102 determines that no slippage of the torque transfer belt 48 was detected by the no-slippage determining unit 102, a slippage count decreasing unit 104 decreases or reduces the count of the slippage counting unit 98, i.e., the number of slippages $n_S$, by a predetermined value, for example, "1".

For the next running of the vehicle, the clamping pressure increasing unit 94 increases the clamping pressure on the torque transfer belt 48 by adding, to the clamping pressure provided by the clamping pressure controller 90, an amount corresponding to the state or degree of increase of the clamping pressure that is obtained in the previous running and stored in the clamping pressure state storing unit 96, namely, an amount corresponding to the number of slippages "$n_S$" which is equivalent to the aforementioned state of increase of the clamping pressure.

Furthermore, if the number of slippages "$n_S$" of the torque transfer belt 48 counted by the slippage counting unit 98 is equal to or less than a predetermined value, such as "1", the clamping pressure increasing unit 94 increases the clamping pressure on the torque transfer belt 48 by a pre-set basic addition value "A". If the number of slippages "$n_S$" exceeds the predetermined value, the clamping pressure increasing unit 94 serially increases the clamping pressure by the basic addition value A and further by a number of proportional addition values B that corresponds to the number of slippages $n_S$. The proportional addition value B is set in advance to be smaller than the basic increase value A.

Figure 7:
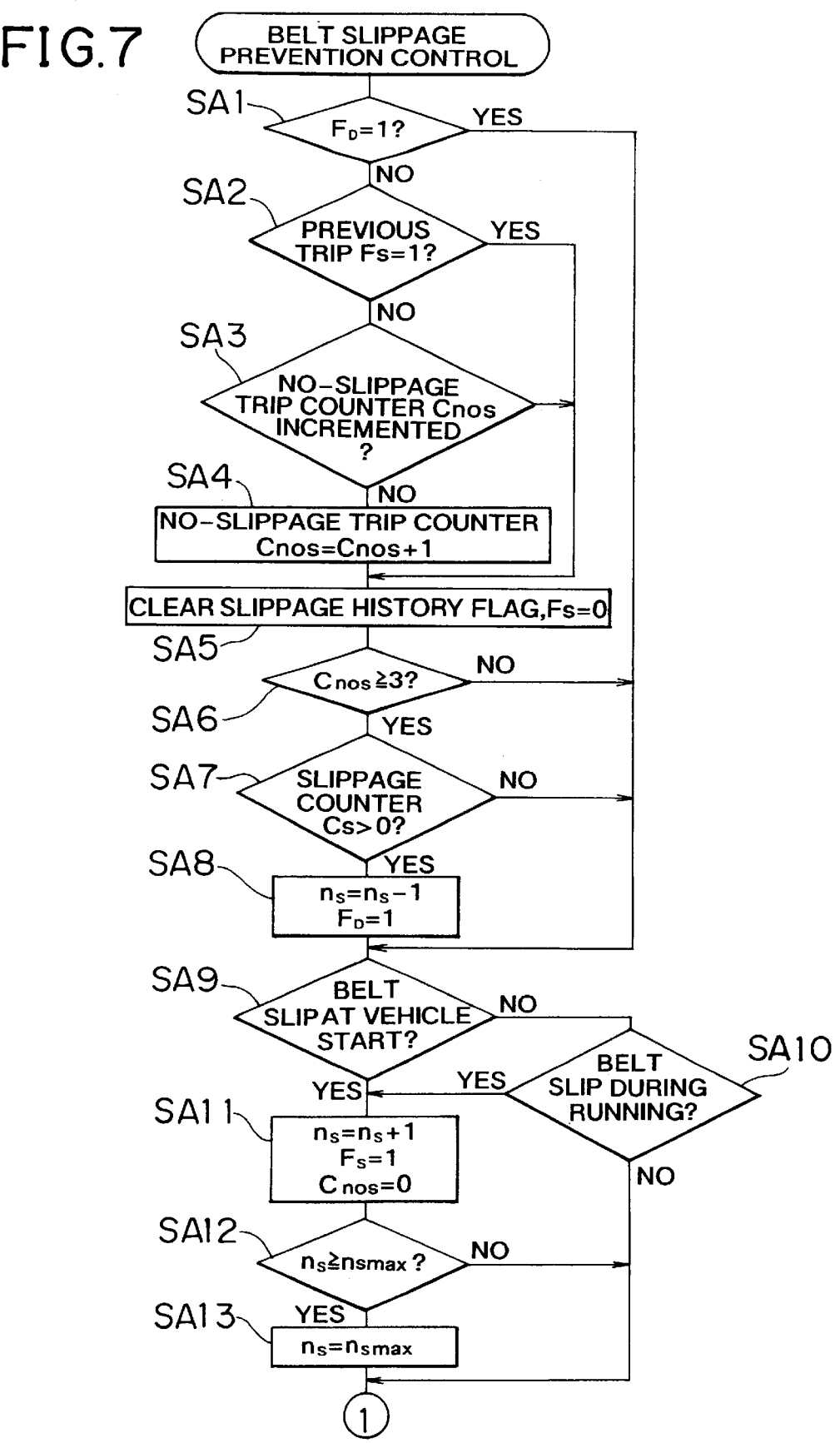
FIG. 7 is a flowchart showing a first portion of a belt slippage prevention control routine performed by the electronic control unit shown in FIG. 4, wherein the first portion of the routine corresponds to a clamping pressure state storing unit and others.
Figure 8:
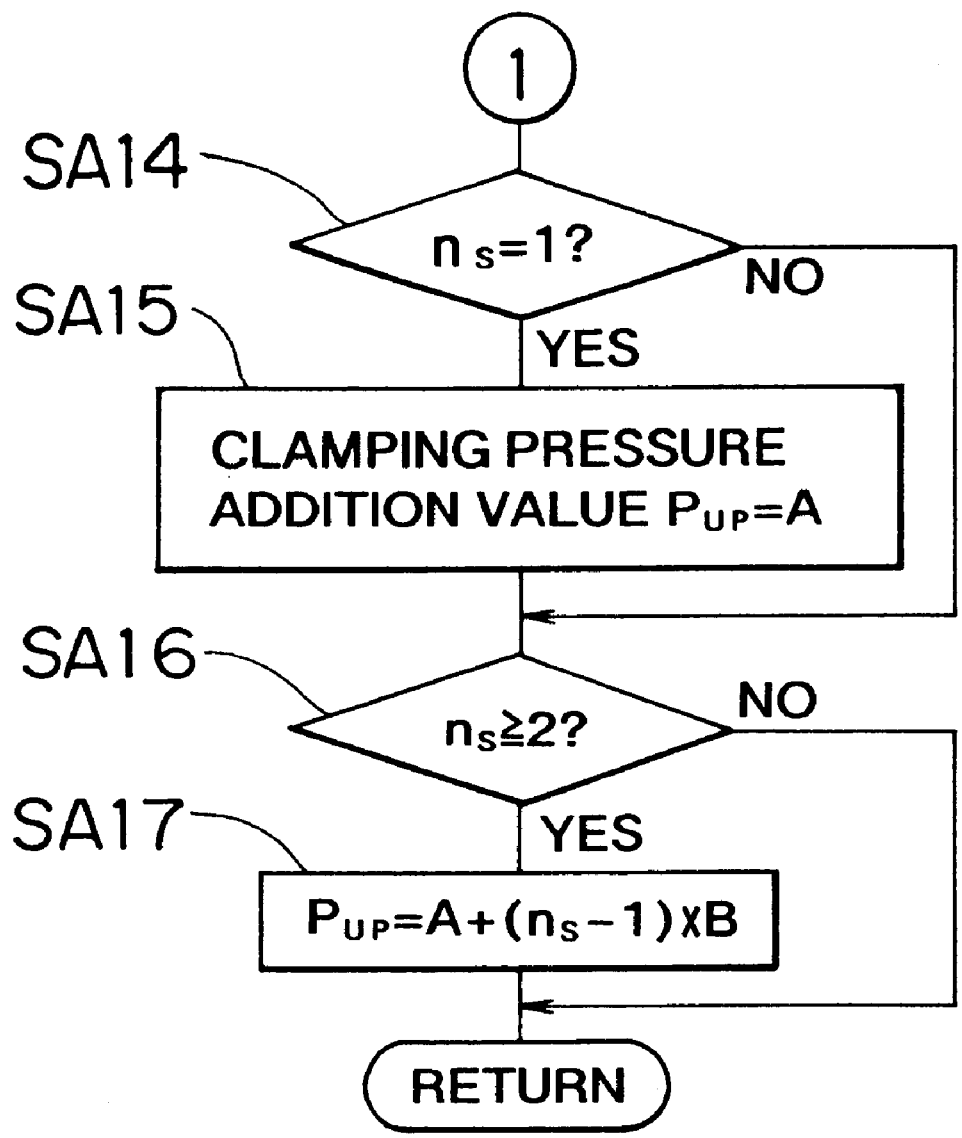
FIG. 8 is a flowchart showing a second portion of the belt slippage prevention control routine which corresponds to a clamping pressure increasing unit.

FIG. 7 is a flowchart illustrating an exemplary control operation of the electronic control unit 66 which is related to a belt slippage prevention control. The process illustrated in FIG. 7 is cyclically executed at certain time intervals. In step SA1, it is determined whether the content of a flag $F_D$ is equal to "1", which indicates that a slippage counter Cs has been decremented. The flag $F_D$ is provided for preventing an erroneous decrement of the slippage counter Cs, and is cleared or set to "0" by, for example, turning off the ignition switch 69. In the initial control cycle, a negative decision "NO" is obtained in step SA1, and the process proceeds to step SA2 to determine whether the content of a slippage history flag Fs is "1". The slippage history flag Fs indicates occurrence of a slippage of the torque transfer belt 48 during a previous trip of the vehicle. If a negative decision "NO" is obtained in step SA2, it is then determined in step SA3 whether a no-slippage trip counter Cnos has been incremented during the present trip. If a negative decision (NO) is obtained in step SA3, "1" is added to the content of the no-slippage trip counter Cnos in SA4. That is, the no-slippage trip counter Cnos is incremented in SA4. Subsequently in SA5, the content of the belt slippage history flag Fs is set to "0" and thus cleared.

If an affirmative decision (YES) is obtained in step SA2 or step SA3, step SA4 for incrementing the no-slippage trip counter Cnos is skipped, and step SA5 is immediately executed, that is, the slippage history flag Fs is cleared.

Subsequently, step SA6, which corresponds to the no-slippage determining unit 102, is executed to determine whether the content of the no-slippage trip counter Cnos has reached or exceeded a predetermined threshold value, for example, "3", namely, to determine whether no slippage of the torque transfer belt 48 has been detected during a running period of three trips. This threshold value corresponds to a running period that is pre-set for checking if the torque transfer belt 48 is in a clamped state with a clamping pressure large enough to avoid slippage of the belt 48. The theoretical value is empirically determined beforehand. In SA7, it is determined whether the content of the slippage counter Cs is greater than "0", namely, whether at least one slippage has been counted by the slippage counter Cs.

If affirmative decisions (YES) are obtained in both SA6 and SA7, the process proceeds to SA8 corresponding to the slippage count decreasing unit 104. In step SA8, the slippage counter Cs is decremented so that the content "$n_S$" of the slippage counter Cs is reduced by "1", and the content of the flag $F_D$ indicating that the slippage counter Cs has been decremented is set to "1". In this embodiment, the slippage counter Cs is decremented if no slippage of the torque transfer belt 48 is detected during three trips of running. Conversely, if a negative decision (NO) is obtained in either step SA6 or step SA7, the process immediately proceeds to SA9, skipping SA8.

Steps SA9 and SA10 correspond to the slippage detecting unit 92. In step SA9, it is determined whether the torque transfer belt 48 slipped at the time of a start of the vehicle, based on, for example, whether the speed ratio γ of the belt-type continuously variable transmission 18 exceeded a pre-set slippage judgement value $γ_B$. If a negative decision (NO) is obtained in step SA9, it is then determined in SA10 whether a slippage of the torque transfer belt 48 has occurred during the running of the vehicle, based on, for example, whether the speed ratio-changing rate Δγ has exceeded a pre-set slippage judgement value $Δγ_C$.

If an affirmative decision (YES) is obtained in either step SA9 or step SA10, it means that a slippage of the torque transfer belt 48 has occurred, and then the control process proceeds to step SA11 corresponding to the slippage counting unit 98 to add "1" to the content "$n_S$" of the slippage counter Cs for counting the number of slippages detected in step SA9 or SA10. That is, the slippage counter Cs is incremented. At the same time, the content of the slippage history flag Fs indicating occurrence of a slippage of the torque transfer belt 48 is set to "1", and the content of the no-slippage trip counter Cnos is cleared or set to "0".

Subsequently, steps SA12 and SA13 corresponding to the slippage count limiting unit 100 are executed. In SA12, it is determined whether the content "$n_S$" of the slippage counter Cs has become equal to or greater than a pre-set limit value "$n_{Smax}$". If a negative decision (NO) is obtained in step SA12, step SA13 is not executed. Conversely, if an affirmative decision (YES) is obtained in step SA12, the content "$n_S$" of the slippage counter Cs is set to the limit value "$n_{Smax}$" in step SA13. If a negative decision (NO) is obtained in both steps SA9 and SA10, steps SA11 to SA13 are not executed, but steps SA14 to SA17 corresponding to the clamping pressure increasing unit 94 are executed.

In step SA14, it is determined whether the content $n_S$ of the slippage counter Cs is equal to "1". If a negative decision (NO) is obtained in step SA14, step SA15 is not executed. Conversely, if an affirmative decision (YES) is obtained in step SA14, a clamping pressure addition value $P_{UP}$ to be added to the belt clamping pressure $P_B$ used by the clamping pressure controller 90 is set to a basic addition value A. The control process then proceeds to step SA16 to determine whether the content "$n_S$" of the slippage counter Cs is "2" or greater. If a negative decision (NO) is obtained in step SA16, step SA17 is not executed. Conversely, if an affirmative decision (YES) is obtained in step SA16, a clamping pressure addition value $P_{UP}$ is calculated from the actual counter content "$n_S$" according to a mathematical expression (1) as indicated below. For example, if the counter content "$n_S$" of the slippage counter Cs is "0", a negative decision (NO) is obtained in both steps SA14 and SA16, and therefore, the clamping pressure addition value $P_{UP}$ is set to zero. If the counter content "$n_S$" is "1", a relatively large clamping pressure addition value $P_{UP}$ (=A) is set in order to effectively suppress or eliminate belt slippage. If the counter content "$n_S$" is "2", the clamping pressure addition value $P_{UP}$ is set to "A+B". In the mathematical expression (1), "B" is a proportional addition value that is added for each increase in the counter content "$n_S$", and is set to a value that is less than the basic addition value A (i.e., B<A).

$$P_{UP}=A+(n_S-1)\times B \tag{1}$$

Therefore, in SA14 to SA17 corresponding to the clamping pressure increasing unit 94, if a slippage of the torque transfer belt 48 is detected during a predetermined running period and the content "$n_S$" of the slippage counter Cs is increased, the clamping pressure addition value $P_{UP}$ is increased for each increase in the counter content $n_S$, and the clamping pressure on the torque transfer belt 48 is accordingly increased. When the ignition switch 69 is turned on upon a start of the next running of the vehicle, a clamping pressure addition value $P_{UP}$ is calculated in accordance with the counter content "$n_S$" stored in the slippage counter Cs (clamping pressure state. storing unit 96) in the previous and preceding running periods, and the clamping pressure on the torque transfer belt 48 is increased by the calculated clamping pressure addition value $P_{UP}$.

As described above, according to the embodiment, the clamping pressure applied to the torque transfer belt 48 is increased in the current running period by the clamping pressure increasing unit 94 (SA14 to SA17), in accordance with the state or degree of increase of the clamping pressure that was obtained during the previous running period and stored in the clamping pressure state storing unit 96 (SA11). Therefore, if a slippage of the torque transfer belt 48 occurs during the previous running period or trip, the torque transfer belt 48 is prevented from slipping again in the current running period or trip. Hence, a reduction in the durability of the torque transfer belt 48 that would be otherwise caused by slippage is substantially prevented.

Furthermore, the apparatus of the embodiment has the slippage detecting unit 92 (SA9, SA10) for detecting a slippage of the torque transfer belt 48, and the clamping pressure increasing unit 94 for increasing the clamping pressure on the torque transfer belt 48 every time a slippage of the torque transfer belt 48 is detected by the slippage detecting unit 92. Since the clamping pressure on the torque transfer belt 48 is increased by the clamping pressure increasing unit 94 every time a slippage of the torque transfer belt 48 is detected by the slippage detecting unit 92, the slippage of the torque transfer belt 48 is immediately eliminated.

Still further, according to the embodiment, the clamping pressure state storing unit 96 includes the slippage counting unit 98 (SA11) for counting the number of slippages or incrementing the count value of the slippage counter every time a slippage of the torque transfer belt 48 is detected by the slippage detecting unit 92. Further, the apparatus of the embodiment further has the no-slippage determining unit 102 (SA6) for determining whether no slippage of the torque transfer belt 48 is detected by the slippage detecting unit 92 within a predetermined number of running periods or trips, and the slippage count decreasing unit 104 (SA8) for decreasing the counter content "$n_S$" of the slippage counting unit 98 if it is determined by the no-slippage determining unit 102 that no slippage of the torque transfer belt 48 is detected within the aforementioned periods. The clamping pressure increasing unit 94 functions to adjust an amount of addition of the clamping pressure applied to the torque transfer belt 48 in accordance with the counter content "$n_S$" of the slippage counting unit 98. Therefore, if no slippage of the torque transfer belt 48 is detected by the slippage detecting unit 92 during the predetermined number of running periods, the amount of the clamping pressure to be added by the clamping pressure increasing unit 94 is reduced to such an extent that no slippage of the torque transfer belt 48 will occur, thus assuring further improved durability of the torque transfer belt 48.

Further, according to the embodiment, one trip, which is a period of vehicle run between a start of the engine caused by turning on the ignition switch 69 and a stop of the engine caused by turning off the ignition switch 69, is used as one running period of the vehicle. Since determination as to whether no slippage has occurred is made based on the state of slippage of the belt-type continuously variable transmission 18 monitored during a relatively long period as mentioned above, the reliability of the determination regarding the state of slippage of the belt-type continuously variable transmission 18 is enhanced.

Further, according to the embodiment, the slippage count limiting unit 100 (SA12, SA13) is provided for limiting the number of slippages "$n_S$" counted by the slippage counting unit 98 to a pre-set upper limit value "$n_{S max}$". Since the number of slippages "$n_S$" counted by the slippage counting unit 98 is limited to the pre-set upper limit value "$n_{S max}$", it is possible to avoid a reduction in the durability of the torque transfer belt 48 that would be otherwise caused by an excessively large clamping pressure applied to the belt 48.

Further, according to the embodiment, if the number of slippages "$n_S$" of the torque transfer belt 48 counted by the slippage counting unit 98 is equal to or smaller than a predetermined value, e.g., "1", the clamping pressure increasing unit 94 increases the clamping pressure $P_B$ by the pre-set basic addition value A. If the number of slippages "$n_S$" exceeds the predetermined value, e.g., "1", the clamping pressure increasing unit 94 increases the clamping pressure $P_B$ by a multiple of the proportional addition value B by the number of slippages, which addition value B is pre-set to be less than the basic addition value A. When a slippage of the torque transfer belt 48 occurs for the first time, therefore, the slippage can be surely suppressed or eliminated, thus assuring an increased durability of the torque transfer belt 48.

While the invention has been described with reference to the drawings, the invention may be embodied in various other fashions.

Although the foregoing embodiment adopts the generally termed belt-type continuously variable transmission 18 including the two variable pulleys 42, 46 and the torque transfer belt 48 wound around the pulleys, the invention is also applicable to other types of continuously variable transmissions, such as a toroidal type continuously variable transmission. In short, the invention is applicable to any type of continuously variable transmission as long as a power transmitting member (i.e., a torque transfer belt in the above embodiment) is disposed and clamped between an input-side rotating body and an output-side rotating body, and the speed ratio is continuously varied by changing the positions of contact of the power transmitting member with the input-side rotating body and the output-side rotating body.

Although the trip as described above is used as the predetermined running period of the vehicle in the illustrated embodiment, it is also possible to use a running period between a start and a stop of the vehicle, a period in which the vehicle runs a pre-set distance, etc., or other period.

In the foregoing embodiment, the slippage count decreasing unit 104 subtracts "1" from the counter content "$n_S$" of the slippage counting unit 98 if no slippage of the torque transfer belt 48 occurs during three trips. However, the counter content "$n_S$" may be decremented under a condition that no slippage occurs during any predetermined number of running periods that is equal to or greater than one.

Although the clamping pressure increasing unit 94 calculates a clamping pressure addition value $P_{UP}$ from an actual number of slippages "$n_S$" based on the mathematical expression (1) in the illustrated embodiment, the use of the mathematical expression (1) is not essential to practice the invention.

In the illustrated embodiment, the controller 66 (shown in FIG. 4) is implemented as a microcomputer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An apparatus for controlling a continuously variable transmission of a motor vehicle that transmits power by applying a friction force to a power transmitting member, the apparatus comprises:

a controller that:

detects a slippage of the power transmitting member in a predetermined period of operation of the vehicle;

increases a clamping pressure that is applied to the power transmitting member if the slippage of the power transmitting member is detected in the predetermined period; and stores a state of increase of the clamping pressure in a memory;

wherein the controller increases the clamping pressure applied to the power transmitting member in accordance with a previous state of increase of the clamping pressure that is stored in the memory.

2. The apparatus according to claim 1, wherein the controller increases the clamping pressure applied to the power transmitting member each time a slippage of the power transmitting member is detected by the controller.

3. The apparatus according to claim 1, wherein:
the memory comprises a counter that counts a number of slippages by incrementing a count value each time the slippage of the power transmitting member is detected by the controller; and
the controller further adjusts an amount of increase of the clamping pressure on the power transmitting member in accordance with the count value of the counter.

4. The apparatus according to claim 3, wherein the controller further:
decreases the count value of the counter when no slippage of the power transmitting member is detected during at least one period of time that corresponds to the predetermined period of operation of the vehicle.

5. The apparatus according to claim 3, wherein the amount of increase of the clamping pressure is increased by a first addition value for each increment of the count value of the counter when the count value is equal to or less than a predetermined value, and is increased by a second addition value for each increment of the count value of the counter when the count value is greater than the predetermined value, the second addition value being set to be smaller than the first addition value.

6. The apparatus according to claim 3, wherein the controller further limits the number of the slippages stored in the counter to a predetermined value.

7. The apparatus according to claim 2, wherein:
the memory comprises a counter that counts a number of slippages by incrementing a count value each time the slippage of the power transmitting member is detected by the controller; and
adjusts an amount of increase of the clamping pressure on the power transmitting member in accordance with the count value of the counter.

8. The apparatus according to claim 7, wherein the controller further:
decreases the count value of the counter when no slippage of the power transmitting member is detected during at least one period of time that corresponds to the predetermined period of operation of the vehicle.

9. The apparatus according to claim 7, wherein the amount of increase of the clamping pressure is increased by a first addition value for each increment of the count value of the counter when the count value is equal to or less than a predetermined value, and is increased by a second addition value for each increment of the count value of the counter when the count value is greater than the predetermined value, the second addition value being set to be smaller than the first addition value.

10. The apparatus according to claim 7, wherein the controller further limits the number of the slippages stored in the counter to a predetermined value.

11. The apparatus according to claim 1, wherein the predetermined period of operation of the vehicle is a period between a start of an engine of the vehicle and a stop of the engine.

12. A method for controlling a continuously variable transmission of a motor vehicle that transmits power by applying a friction force to a power transmitting member, the method comprising:
detecting a slippage of the power transmitting member in a predetermined period of operation of the vehicle;
increasing a clamping pressure that is applied to the power transmitting member if the slippage of the power transmitting member is detected in the predetermined period; and
storing a state of increase of the clamping pressure;
wherein the clamping pressure applied to the power transmitting member is increased in accordance with a previous state of increase of the clamping pressure that is stored.

13. The method according to claim 12, wherein the clamping pressure applied to the power transmitting member is increased each time a slippage of the power transmitting member is detected.

14. The method according to claim 12, wherein:
the step of storing further comprises counting the number of slippages by incrementing a count value each time the slippage of the power transmitting member is detected; and
the method further comprises:
adjusting an amount of increase of the clamping pressure on the power transmitting member in accordance with the count value.

15. The method according to claim 14, further comprising:
decreasing the count value when no slippage of the power transmitting member is detected during at least one period of time that corresponds to the predetermined period of operation of the vehicle.

16. The method according to claim 14, wherein the amount of increase of the clamping pressure is increased by a first addition value for each increment of the count value when the count value is equal to or less than a predetermined value, and is increased by a second addition value for each increment of the count value when the count value is greater than the predetermined value, the second addition value being set to be smaller than the first addition value.

17. The method according to claim 14, wherein the step of storing further comprises:
limiting the number of slippages to a predetermined value.

18. The method according to claim 13, wherein:
the step of storing further comprises counting the number of slippages by incrementing a count value each time the slippage of the power transmitting member is detected; and
the method further comprises:
adjusting an amount of increase of the clamping pressure on the power transmitting member in accordance with the count value.

19. The method according to claim 18, further comprising:
decreasing the count value when no slippage of the power transmitting member is detected during at least one period of time that corresponds to the predetermined period of operation of the vehicle.

20. The method according to claim 18, wherein the amount of increase of the clamping pressure is increased by a first addition value for each increment of the count value when the count value is equal to or less than a predetermined value, and is increased by a second addition value for each increment of the count value when the count value is greater than the predetermined value, the second addition value being set to be smaller than the first addition value.

21. The method according to claim 18, wherein the step of storing further comprises:
limiting the number of slippages to a predetermined value.

22. The method according to claim 12, wherein the predetermined period of operation of the vehicle is a period between a start of an engine of the vehicle and a stop of the engine.

* * * * *